United States Patent [19]
Tuvy et al.

[11] Patent Number: 5,724,421
[45] Date of Patent: Mar. 3, 1998

[54] TELEPHONE NETWORK INTERFACE APPARATUS

[75] Inventors: Avraham Tuvy, Oakhurst; Anthony L. Nieves, Belmar; Michael P. DiLonardo, Toms River, all of N.J.

[73] Assignee: Antec Corp., Rolling Meadows, Ill.

[21] Appl. No.: 559,565

[22] Filed: Nov. 16, 1995

[51] Int. Cl.⁶ ..................................................... H04M 1/24
[52] U.S. Cl. ........................... 379/399; 379/412; 379/429; 379/442
[58] Field of Search .................... 379/399, 327, 379/328, 329, 442, 412, 429, 93.07, 110.12; 439/620, 509, 535, 97, 49; 361/600, 601, 718, 719, 720, 299.2, 299.3

[56] References Cited

U.S. PATENT DOCUMENTS

| | | | |
|---|---|---|---|
| 2,858,372 | 10/1958 | Kaufman | 450/836 |
| 3,308,422 | 3/1967 | Boysen | 379/325 |
| 3,535,463 | 10/1970 | Trucco | 179/98 |
| 3,936,133 | 2/1976 | Splitt et al. | 339/198 R |
| 4,012,096 | 3/1977 | DeLuca et al. | 339/18 R |
| 4,029,376 | 6/1977 | Headington et al. | 339/19 |
| 4,126,369 | 11/1978 | Rapata et al. | 339/113 R |
| 4,447,105 | 5/1984 | Ruehl | 339/113 R |
| 4,554,609 | 11/1985 | Ruehl et al. | 361/119 |
| 4,634,209 | 1/1987 | Forberg et al. | 339/147 R |
| 4,651,340 | 3/1987 | Marson | 379/156 |
| 4,654,753 | 3/1987 | Ruehl et al. | 361/111 |
| 4,688,865 | 8/1987 | Kelly | 439/79 |
| 4,729,064 | 3/1988 | Singer, Jr. | 361/426 |
| 4,758,921 | 7/1988 | Hung | 361/119 |
| 4,764,950 | 8/1988 | Dickey et al. | . |
| 4,782,245 | 11/1988 | Henry | 307/147 |
| 4,820,195 | 4/1989 | Siemon | 439/510 |
| 4,846,735 | 7/1989 | Teichler et al. | 439/709 |
| 4,875,868 | 10/1989 | Cwirzen et al. | 439/188 |
| 4,882,748 | 11/1989 | Meyerhoefer | 379/332 |
| 4,913,663 | 4/1990 | Siemon et al. | 439/509 |
| 4,919,544 | 4/1990 | Graham | 379/399 |
| 4,922,374 | 5/1990 | Mueller | 361/119 |
| 4,924,345 | 5/1990 | Siemon et al. | 361/111 |
| 4,932,051 | 6/1990 | Karan et al. | 379/399 |
| 4,968,260 | 11/1990 | Ingalsbe | 439/76 |
| 4,980,909 | 12/1990 | Meyerhoefer et al. | 379/327 |
| 5,175,662 | 12/1992 | DeBalko et al. | 361/119 |
| 5,207,583 | 5/1993 | DeBalko et al. | 439/49 |
| 5,260,994 | 11/1993 | Suffi | 379/399 |
| 5,297,199 | 3/1994 | Graham et al. | 379/399 |
| 5,318,461 | 6/1994 | Frikkee et al. | 439/715 |
| 5,341,269 | 8/1994 | Hayward et al. | 361/119 |
| 5,394,466 | 2/1995 | Schneider et al. | 379/399 |
| 5,412,715 | 5/1995 | Volpe et al. | 377/326 |
| 5,416,837 | 5/1995 | Cote et a. | 379/399 |
| 5,553,136 | 9/1996 | Meyerhoefer et al. | 379/399 |

FOREIGN PATENT DOCUMENTS

| | | |
|---|---|---|
| 59-115692 | 7/1984 | Japan. |
| 61-187491 | 8/1986 | Japan. |
| 2056791 | 3/1981 | United Kingdom. |

*Primary Examiner*—Krista Zele
*Assistant Examiner*—Jacques M. Saint-Surin
*Attorney, Agent, or Firm*—R. Gale Rhodes, Jr.

[57] ABSTRACT

Network interface apparatus for being mounted on a connector block and for interconnecting at least one incoming telephone company line to at least one telephone subscriber line and for providing a response to signals carried by the incoming telephone company line such as a response to test signals carried by the incoming telephone line to locate a fault as being on the telephone central office side of the apparatus or on the telephone subscriber side of the apparatus.

33 Claims, 8 Drawing Sheets

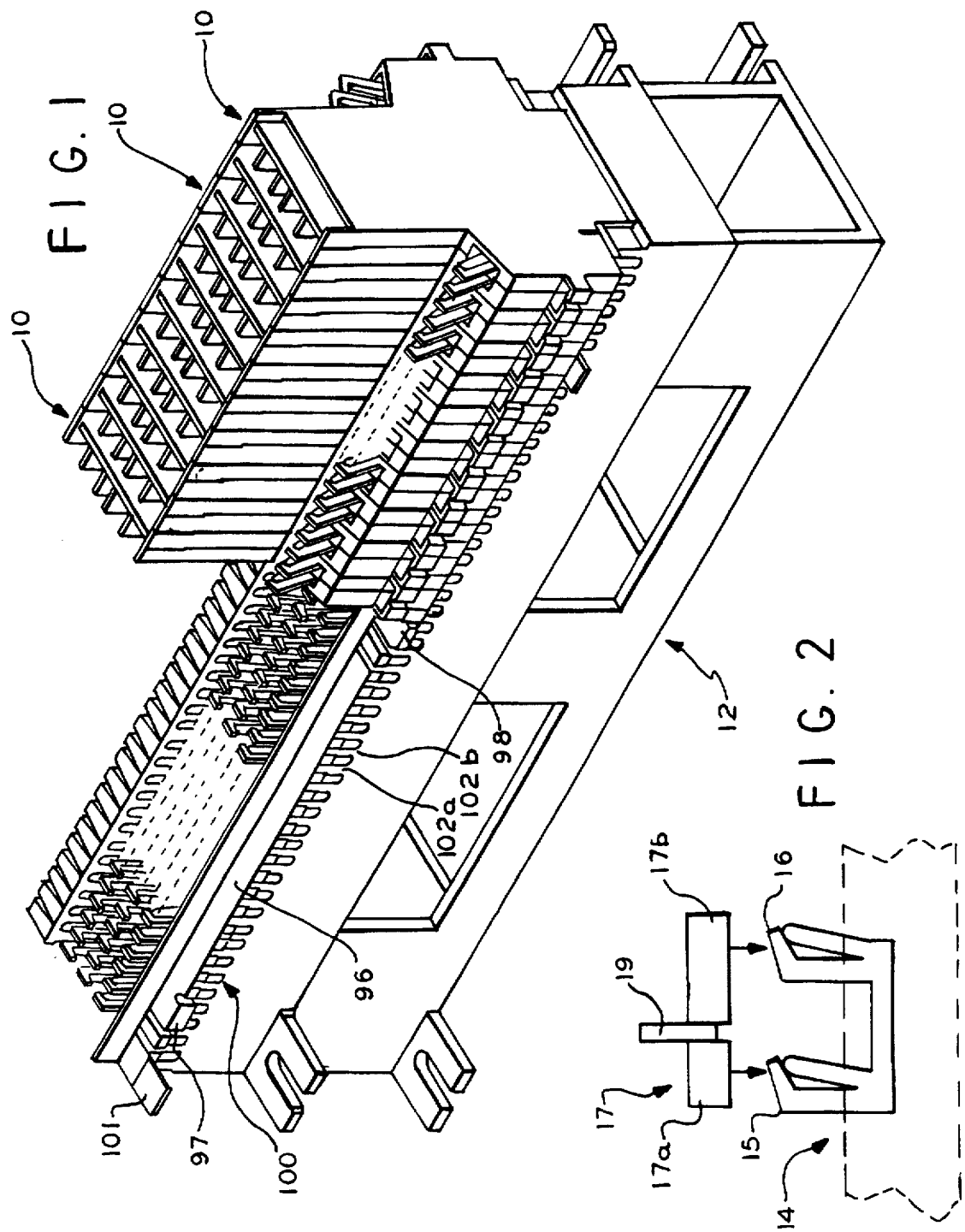

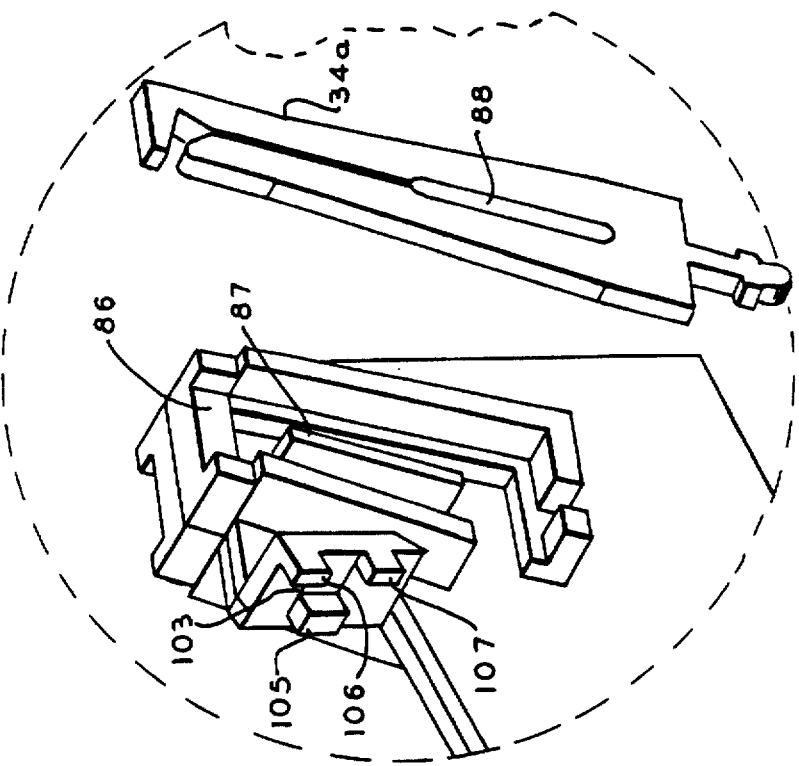
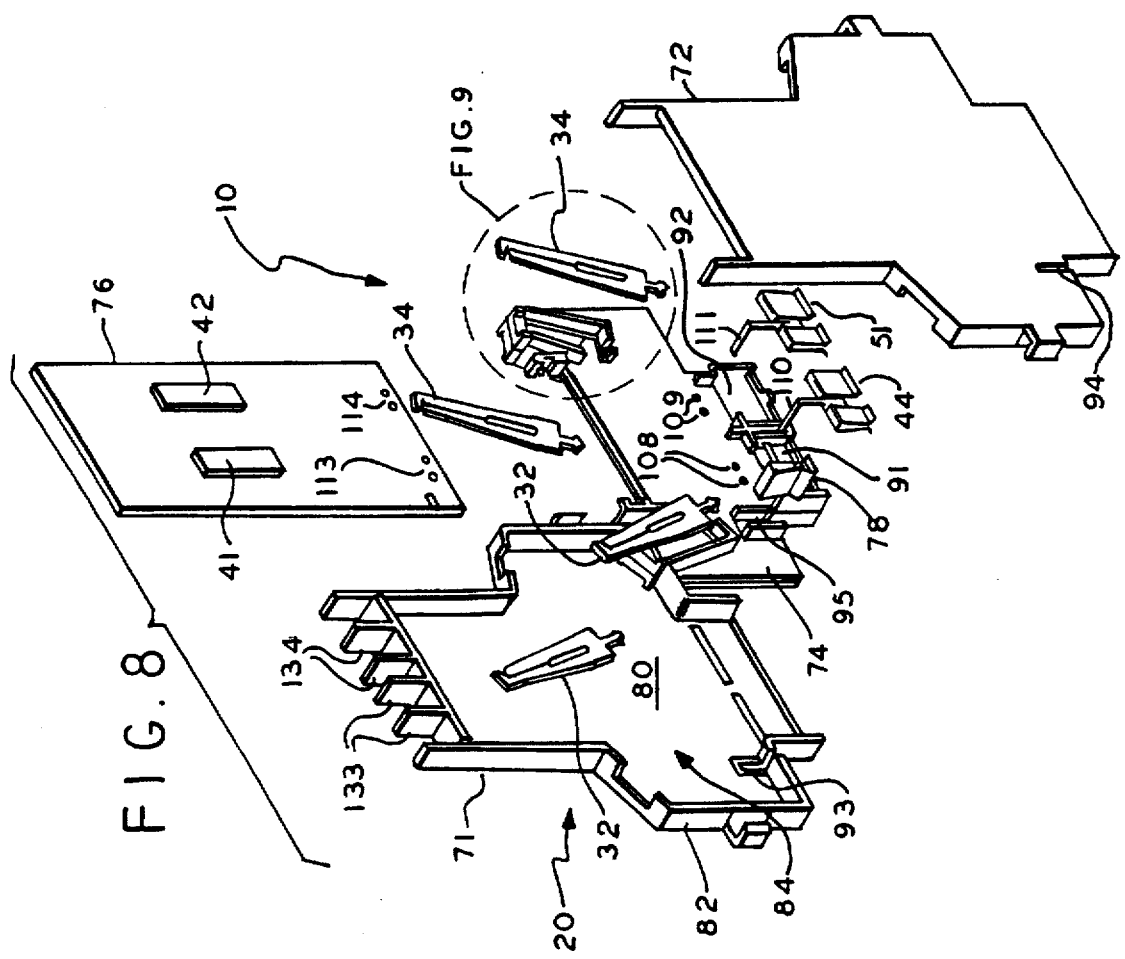

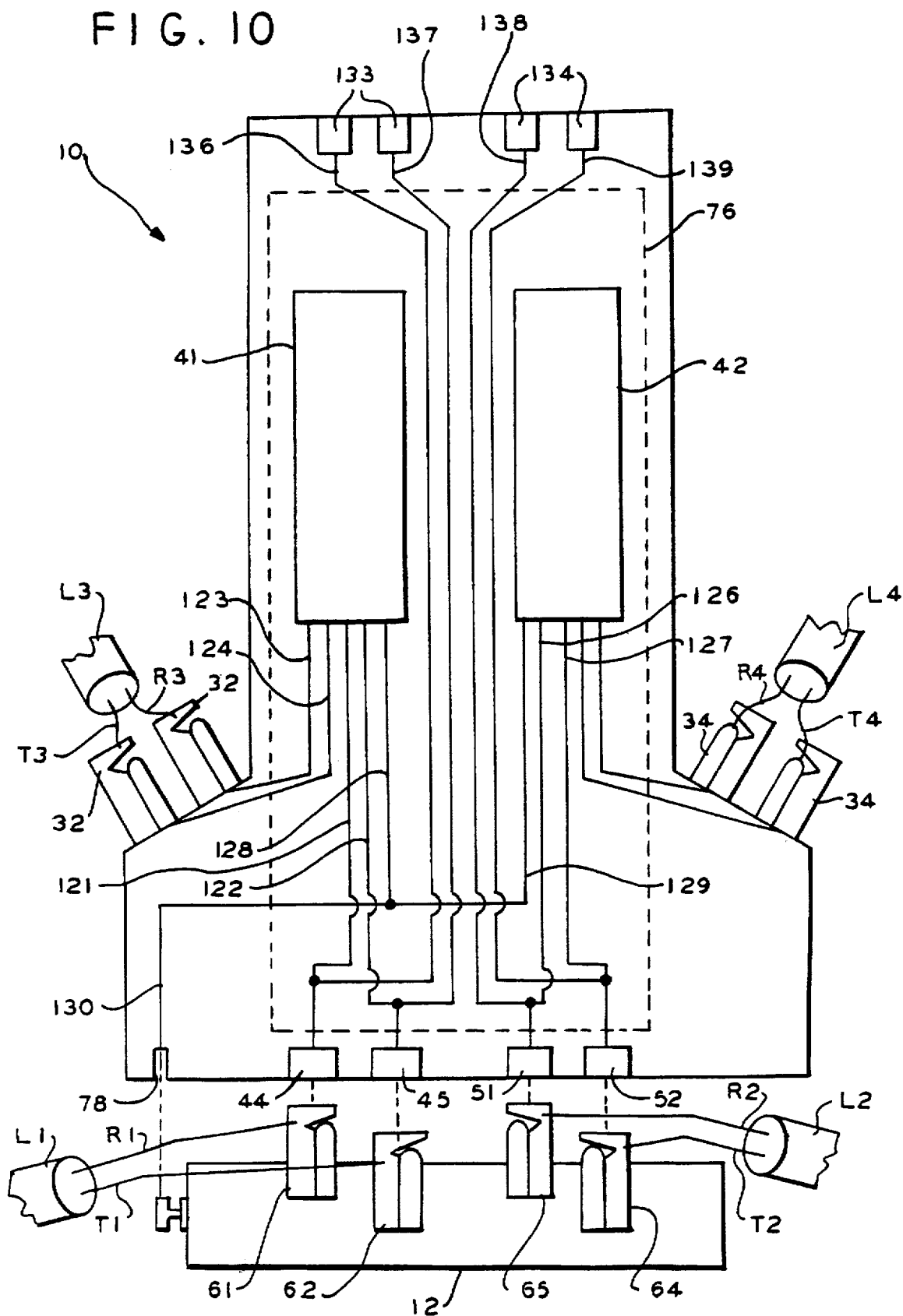

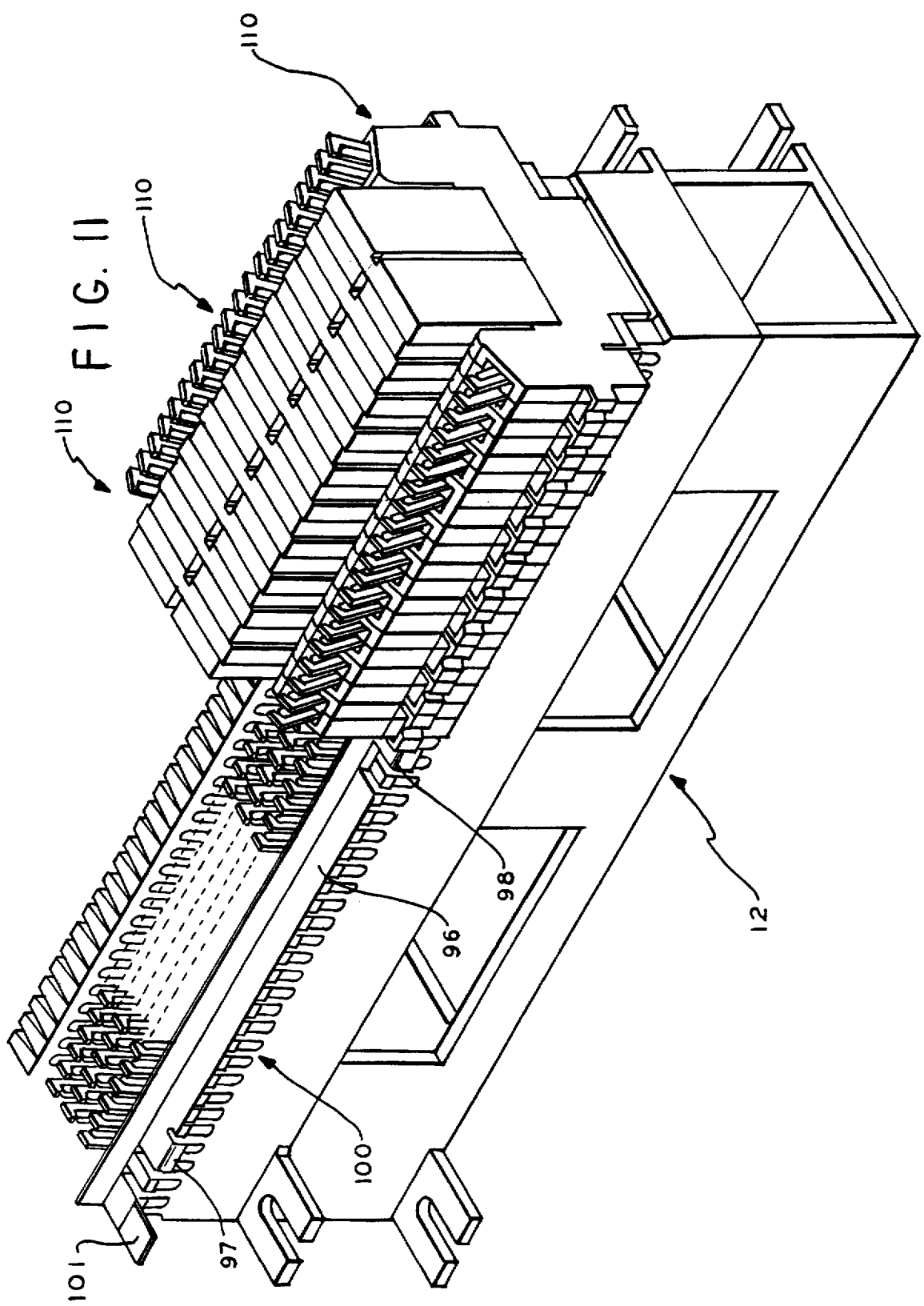

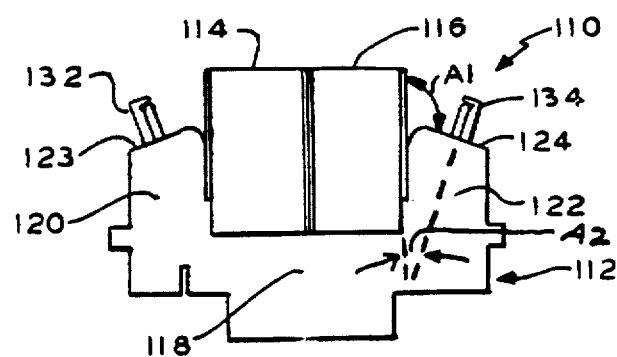
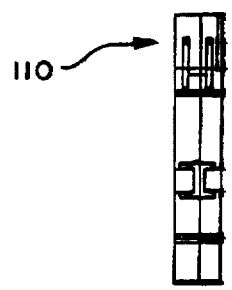
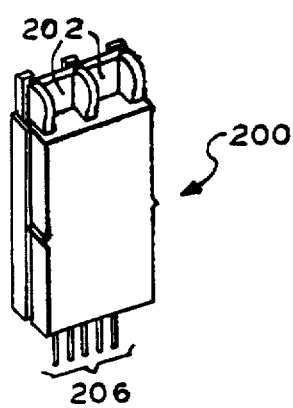
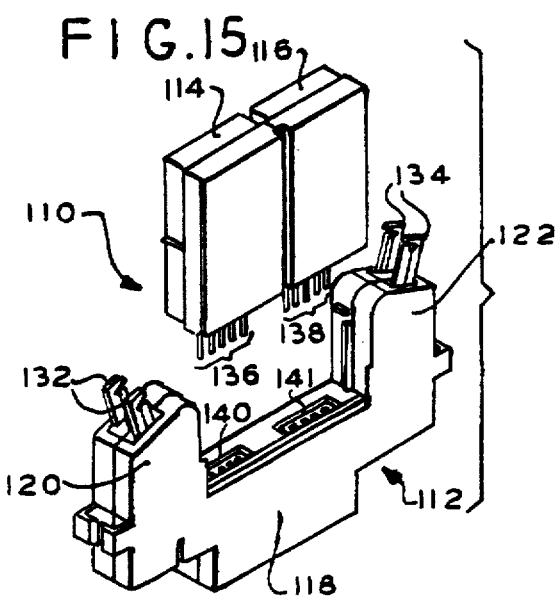
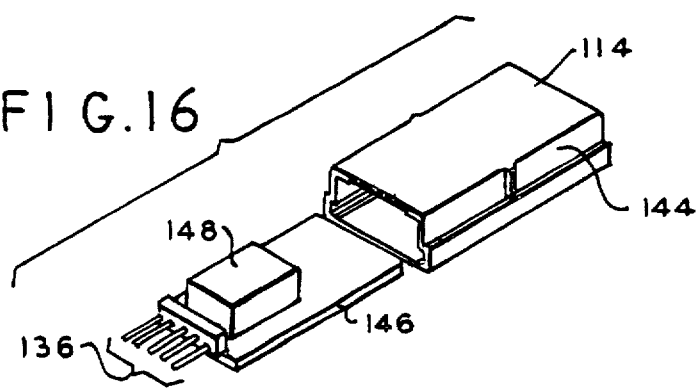

TELEPHONE NETWORK INTERFACE APPARATUS

BACKGROUND OF THE INVENTION

This invention relates generally to telephone network interface apparatus for being mounted to a connector block and for interconnecting at least one incoming telephone line to at least one telephone subscriber line and for providing a response to signals carried on the incoming telephone line. More particularly, the present invention relates to apparatus or a module for being mounted to a connector block and for interconnecting at least one incoming telephone line to at least one telephone subscriber line and for housing a telephone circuit such as, for example, a half ringer, an RFI circuit, an attenuator circuit, or a circuit for locating a fault as being either on the telephone central office side of the module or on the telephone subscriber equipment side of the module which circuit is referred to in the art as a maintenance terminating unit (MTU). The telephone subscriber equipment is sometimes referred to in the art as telephone station apparatus or terminal equipment and may be, for example, the telephone of a telephone subscriber.

Numerous maintenance terminating circuits or MTU's are known to the art, such as for example those disclosed in U.S. Pat. No. 4,396,809 issued on Aug. 2, 1983 and entitled MAINTENANCE TERMINATION UNIT, U.S. Pat. No. 4,710,949 issued on Dec. 1, 1987 and entitled TELEPHONE LINE FAULT LOCATING DEVICE and U.S. Pat. No. 5,357,556 issued on Oct. 18, 1994 and entitled SYSTEM AND METHOD FOR TELEPHONE NETWORK TESTING.

Numerous apparatus and modules are known to the art for being mounted on a connector block, such as the 66 connector block, and which apparatus or modules are for containing a circuit such as for example a protector circuit, an attenuator circuit, or an MTU. However, none of these prior apparatus or modules also connect one or more incoming telephone company lines to one or more subscriber lines.

Accordingly, there exists a need in the art for apparatus or module for being mounted to a connector block and which both interconnects at least one incoming telephone line to at least one telephone subscriber line and also contains a telephone circuit, such as, for example, an MTU, for locating a fault as being on either the telephone central office side of the module or on the telephone subscriber equipment side of the module.

SUMMARY OF THE INVENTION

It is the object of the present invention to satisfy the foregoing need in the art.

Apparatus or module satisfying the foregoing need and embodying the present invention may include a housing in which a telephone circuit is mounted and to which connectors are mounted to mount the housing to the telephone terminals of a connector block, to interconnect at least one incoming telephone company line with at least one telephone subscriber line and to interconnect the telephone circuit to the lines.

DESCRIPTION OF THE DRAWINGS

FIG. 1 is a perspective view showing a plurality of the apparatus or module of the present invention mounted to a connector block;

FIG. 2 is a diagrammatical view illustrating the connection of the terminal contacts to the telephone terminals;

FIG. 8 is an exploded view showing the detailed structure of the apparatus and module of the present invention;

FIG. 9 is an enlarged view of the encircled portion of FIG. 8;

FIG. 10 is a diagrammatical view illustrating the electrical interconnections between the components of the apparatus and module of the present invention and pairs of telephone terminals;

FIG. 11 is a perspective view showing a plurality of an alternate embodiment of the apparatus or module of the present invention mounted to a connector block;

FIGS. 12, 13 and 14 are, respectively, front, left side and bottom views of the second embodiment of the apparatus and module of the present invention;

FIG. 15 is an exploded view of the second embodiment of the present invention;

FIG. 16 is an exploded view of a plug-in module of the present invention;

FIG. 18 is a perspective view of a test plug-in module of the present invention.

DESCRIPTION OF THE PREFERRED EMBODIMENTS

Figure 3:
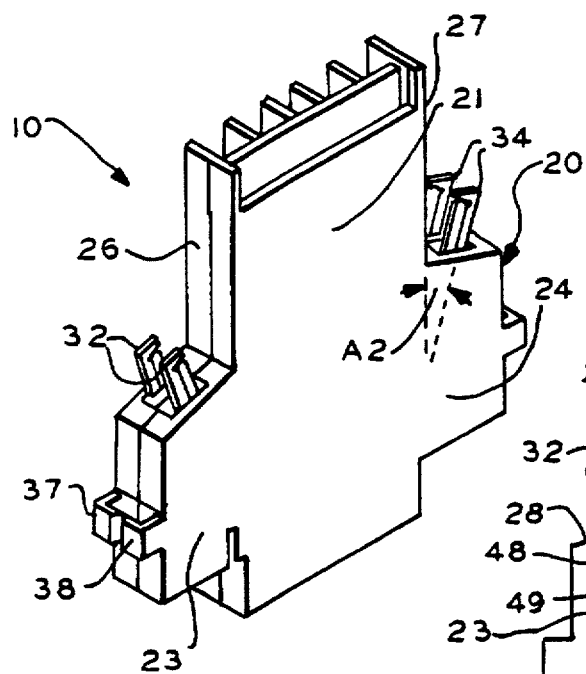
FIG. 3 is a perspective view of the apparatus and module of the present invention.

Referring now to FIGS. 1 to 10 there is shown apparatus or module embodying the present invention and indicated by general numerical designation 10. It will be generally understood that the apparatus 10 is for being mounted on a connector block, such as connector block 12 shown in FIG. 1, and is for interconnecting two incoming telephone company lines to two telephone subscriber lines and for providing a response to signals carried by the incoming telephone company lines such as, for example, providing a response to test signals from the telephone central office sent over the incoming telephone company lines to locate a fault as being on either the telephone central office side of the module or on the telephone subscriber equipment side of the module.

The connector block 12 shown in FIG. 1 may be, for example, the 66 connector block known to the art which is provided with 25 pairs of telephone terminals along each side which are arranged in columns or rows. In the configuration of the invention illustrated in FIG. 1, up to 25 incoming telephone company lines are terminated to the 25 pair of telephone terminals provided along the left side of the block as viewed in FIG. 1 and up to 25 incoming telephone company lines are connected to the 25 pairs of telephone terminals provided along the rightward side of the connector block 12 as viewed in FIG. 1. As is further known, typically, each telephone terminal of a pair of telephone terminals mounted on the connector block 12 is in fact a dual or double telephone terminal as indicated diagrammatically in FIG. 2. As is further shown in FIG. 2, the representative telephone terminal indicated by general numerical designation 14 is in fact a dual or double telephone terminal including integrally formed and electrically interconnected telephone terminals 15 and 16. As known to those skilled in the art, the dual telephone terminals illustrated in FIG. 2 permit the 66 block to interconnect either 50 incoming telephone lines to 50 telephone subscriber lines or to interconnect 25 incoming telephone lines to 25 subscriber lines depending upon the cross connection features chosen from those permitted by the dual telephone terminals. Since, as noted above, in the use of the present invention is illustrated in FIG. 1, up to 25 incoming telephone company lines are terminated to the 25 pairs of telephone terminals along each side of the connector block 12, only one terminal of each dual telephone terminal is used to terminate a conductor, either tip or ring, of an incoming telephone company line, e.g. telephone terminal 15 shown in FIG. 2, and the other terminal, e.g. telephone terminal 16 shown in FIG. 2, is not used to terminate a conductor. For example, and referring again to FIG. 2, the tip conductor (not shown) of an incoming telephone company line would be connected to the terminal 15 and no conductor would be connected to the terminal 16. The other telephone terminal comprising a pair of telephone terminals in conjunction with telephone terminal 14 shown in FIG. 2 would have, for example, the ring conductor of the incoming telephone company line terminated to the terminal equivalent to terminal 15 shown in FIG. 2 and no conductor would be connected to the terminal equivalent to the terminal 16 shown in FIG. 2. However, since the terminals provided on the connector block 12 are in fact dual terminals the apparatus or module 10 of the present invention includes a spring clip terminal contact indicated by general numerical designation 17 which includes portions 17a and 17b for clipping onto the terminals 15 and 16 even though no conductor is connected to terminal 16; the terminal contact 17 includes a contact 19 and it will be understood that 17a, 17b and 19 are formed integrally. It has been found that the use of terminal contacts such as terminal contact 17 to clip onto both terminals of the dual telephone terminals, such as terminals 15 and 16 shown in FIG. 2, provides increased stability and effectiveness to the mounting of the apparatus or module 10 to the connector block 12. The mounting of the apparatus 10 to the connector block 12 is described in further detail below.

Figure 4:
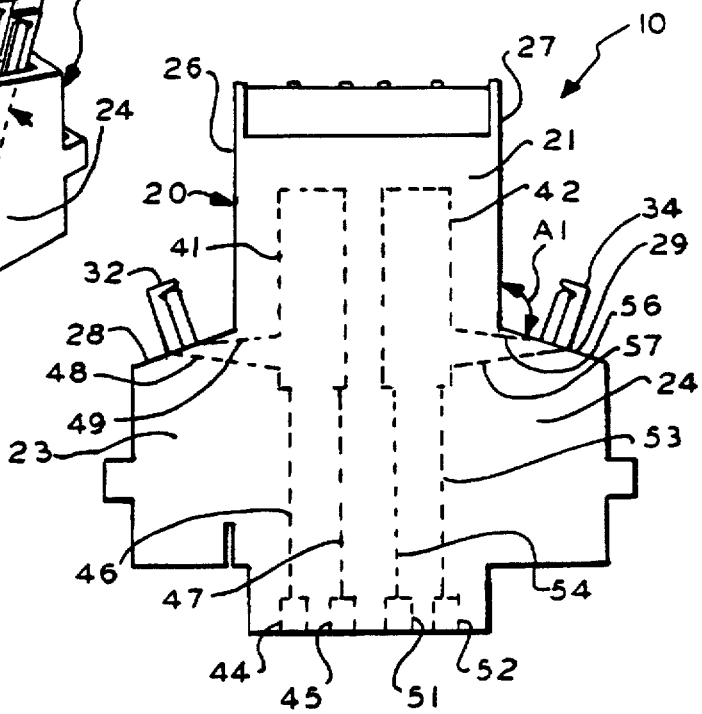
FIGS. 4, 5 and 6 are, respectively, front, right side and bottom views of the apparatus and module of the present invention.
Figure 5:
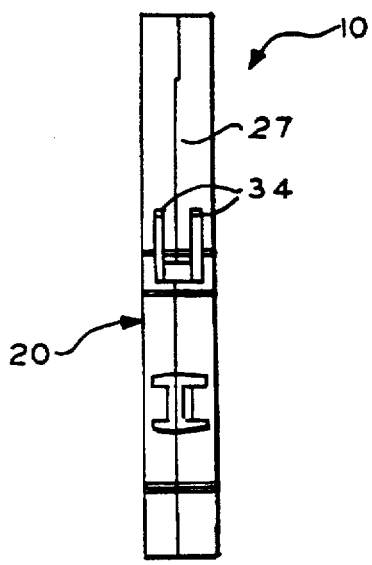

The apparatus or module 10 of the present invention, note particularly FIGS. 3 and 4, includes a housing indicated by general numerical designation 20 which in turn includes a central generally rectangular portion 21 and a pair of opposed generally trapezoidal side portions 23 and 24 extending laterally outwardly from the central portion 21. The central portion 21 includes a pair of opposed parallel flat surfaces 26 and 27, and the trapezoidal portions 23 and 24 include a pair of flat angular surfaces 28 and 29 inclined upwardly towards and intersecting the side surfaces 26 and 27 of the central portion 21 at an obtuse angle A1 shown in FIG. 4. The angle A1 may be about 110°.

Figure 6:
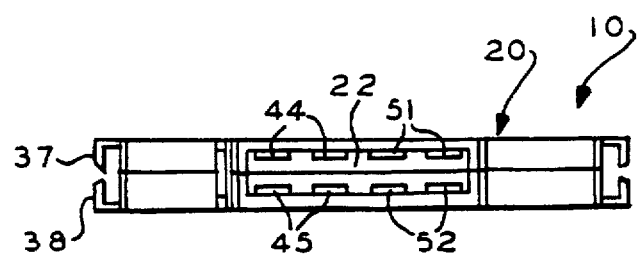

Two pairs of telephone subscriber terminals 32 and 34, FIGS. 3 and 4, are mounted respectively in the trapezoidal portions 23 and 24 of the housing 20 and extend upwardly and outwardly through the flat angular surfaces 28 and 29 and are disposed at an acute angle A2, FIG. 3, with respect to the housing central portion 21; the angle A2 is about 20°. The pairs of telephone subscriber terminals 32 and 34 are for being connected to telephone subscriber lines, not shown, which are connected to telephone subscriber equipment such as, for example, the telephone of the telephone subscriber. It has been found that the angular disposition of the pairs of telephone subscriber terminals 32 and 34 facilitate connection of the terminals to the telephone subscriber lines upon the apparatus 10 being mounted to a connector block such as connector block 12 shown in FIG. 1. The outer portions of the housing trapezoidal portions 23 and 24 may be provided with pairs of telephone subscriber line organizing members 37 and 38 as shown in FIGS. 3 and 6.

Referring further generally to the apparatus or module 10 of the present invention, and to FIG. 4, it will be understood that a pair of telephone circuits are mounted in the housing 20 and are indicated in FIG. 4 by dashed outlines 41 and 42. In the preferred embodiment, the telephone circuits 41 and 42 are maintenance terminating units, or MTU's, of the type noted above. The telephone circuit or MTU 41 is connected to the tip and ring conductors of an incoming telephone company line, not shown, by the pair of spring clip terminal contacts 44 and 45, of the type known to the art, and by the conductors 46 and 47, as shown in dashed outline in FIG. 4. The telephone circuit or MTU 41 is connected to the pair of telephone subscriber terminals 32 by the conductors 48 and 49 also shown in dashed outline in FIG. 4. The telephone circuit or MTU 42 is connected to the tip and ring conductors of another incoming telephone company line, not shown, by the pair of spring clip terminal contacts 51 and 52 and by conductors 53 and 54 shown in dashed outline in FIG. 4. In addition, the telephone circuit or MTU 42 is connected to the pair of telephone subscriber terminals 34 by the pair of conductors 56 and 57 also shown in dashed outline in FIG. 4. As will be understood by those skilled in the art, when the telephone circuits or MTU's 41 and 42 are not locating a fault in response to test signals from the telephone central office carried over the incoming telephone company lines, telephone talk signals to and from telephone subscribers flow or pass through the MTU's.

Apparatus or module 10 further includes pairs of spring clip terminal contacts 44 and 45 and 51 and 52, shown in dashed outline in FIG. 4, and it will be understood that each spring clip terminal contact is the same as the spring clip terminal contact 17 shown in FIG. 2 and described above. These terminal contacts clip onto, or wedgedly engage and slide over, the telephone terminals such as the terminals 15 and 16 shown in FIG. 2, to mechanically and electrically engage the telephone terminals. As may be better understood from FIG. 6, and as will be described in detail below, the pairs of terminal contacts 44 and 45 and 51 and 52 are mounted in the bottom of the housing 20 and are exposed or accessible through the opening 22 formed in the bottom of the housing for clipping onto or wedgedly sliding over the telephone terminals as indicated diagrammatically by the downwardly extending arrows in FIG. 2.

Figure 7:
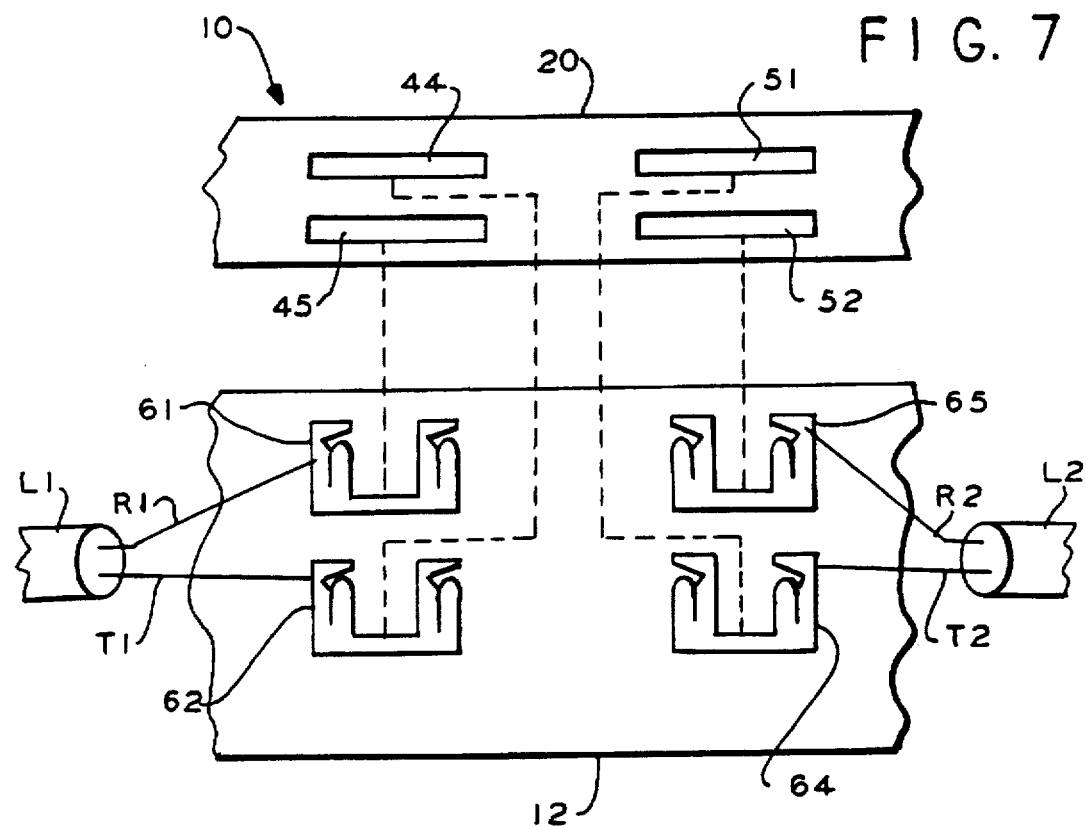
FIG. 7 is a diagrammatical view illustrating the mounting of the apparatus or module of the present invention to a connector block.

The mounting of the apparatus or module 10 of the present invention to the telephone terminals provided on the connector block 12, FIG. 1, is illustrated further diagrammatically in FIG. 7 wherein a portion of the bottom portion of the housing 20 in which the pairs of spring clip terminal contacts 44 and 45 and 51 and 52 are mounted and a portion of the connector block 12 on which representative pairs of telephone terminals 61 and 62 and 64 and 65 are shown. As illustrated in FIG. 7, the tip and ring conductors T1 and R1 of a first incoming telephone company line L1 are connected to one terminal of the pair of dual telephone terminals 61 and 62 and the tip and ring conductors T2 and R2 of a second incoming telephone company line L2 are connected to one terminal of the pair of dual telephone terminals 64 and 65. The pairs of terminal contacts 44 and 45 clip onto the pairs of telephone terminals 61 and 62 and the pair of terminal contacts 51 and 52 clip onto the pair of telephone terminals 64 and 65 as indicated by the dashed lines in FIG. 4. Upon clipping onto and wedgedly engaging the telephone terminals 61 and 62 and 64 and 65, the pairs of terminal contacts 44 and 45 and 51 and 52 mechanically and electrically engage the telephone terminals, mount the apparatus module 10 to the connector block 12 and electrically interconnect the incoming telephone company lines L1 and L2 to the telephone circuits or MTU's 41 and 42 shown in FIG. 4 and as described above.

Referring to FIGS. 8 and 9, the detailed structure of the apparatus or module 10 of the present invention is shown. The housing 20 includes a pair of opposed housing members 71 and 72, a support or mounting member 74, a printed circuit board 76, the pairs of telephone subscriber terminals 32 and 34, the pairs of spring clip terminal contacts 44 and 45 and 51 and 52 (only pair of telephone contacts 44 and 51 are shown in FIG. 8, but it will be understood that the pair of terminal contacts 45 and 52 reside behind the support or mounting member 74) and a spring clip ground contact 78. As will be understood by reference to housing member 71, the housing members include a base such as base 80 surrounded by an outwardly extending wall 82 which provides a compartment indicated by numerical designation 84. The compartment 84 provided by the housing member 71 in cooperation with the compartment (not shown) provided by the housing member 72 cooperatively provides a compartment for receiving the support or mounting member 74, the printed circuit board 76, the terminal contacts 44 and 45 and 51 and 52 and the lower portions of the pairs of telephone subscriber terminals 32 and 34. It will be understood that the housing members 71 and 72 may be suitably secured together such as for example by ultrasonic welding.

Referring further to FIGS. 8 and 9, the support or mounting member 74 is provided with slots for receiving the lower portions of the pairs of telephone subscriber terminals 32 and 34 to facilitate mounting of such telephone subscriber terminals to the support member 74 and thereby to the housing 20. Representative slot 86 is shown in detail in FIG. 9, and an outwardly extending locating member 87 is provided for extending into an opening 88 formed in the central portion of the representative telephone subscriber terminal 34A to position and locate the telephone subscriber terminal 34A longitudinally in the slot 86.

The support or mounting member 74 also is provided with compartments 91 and 92, FIG. 8, for receiving the representative pairs of spring clip terminal contacts 44 and 51. The spring clip ground contact 78 is mounted in a slot 95 formed in the mounting member 74 and slots 93 and 94 provided respectively in the housing members 71 and 72 receive the ground bar or bus 96 shown in FIG. 1 upon the apparatus or module 10 of the present invention being mounted onto the connector block 12 of FIG. 1 whereupon the spring clip ground connector 78 clips onto and mechanically and electrically engages the ground bar or bus 96. The ground bar 96, FIG. 1, is provided with mounting members (not shown) which are wedged between upwardly extending adjacent tabs, such as tabs 102a and 102b, FIG. 1, which define the fanning strip 100 provided on the connector blank 12. The ground bar 96 is mounted with stop members 97 and 98 which determine the position of the ground bar on the fanning strip 100. The ground bar 96 is provided with a ground contact 101 for being connected to earth ground.

The printed circuit board 76, FIG. 8, is mounted to the support member 74 by having its opposed lower side portions received wedgedly within slots such as representative slot 103 shown in FIG. 9. Slot 103 is provided by outwardly extending members 105 and 106 and 107. The telephone circuits or MTU's 41 and 42, shown in dashed outline in FIG. 4 and described above, may be embodied as integrated circuits such as application specific integrated circuits (ASIC's) and suitably mounted to the printed circuit board 76 in the manner known to the art. Referring still to FIG. 8, the mounting or support member 74 is provided with pairs of holes 108 and 109 extending therethrough for receiving the contacts such as the contacts 110 and 111 provided on the pairs of terminal contacts 44 and 45 and the contacts of the pairs of terminal contacts 45 and 52 not shown in FIG. 8 but residing on the opposite side of the support member 74. The contacts 110 and 111 extend into contact holes or apertures 113 and 114 provided in the printed circuit board 76 to make electrical contact with the printed circuit board. It will be understood that the pairs of contacts provided on the terminal contacts 45 and 52 residing behind the support member 74 extend through holes in the support board and into the other terminal openings or apertures provided in the printed circuit board 76 to electrically interconnect the other terminal contacts 45 and 52 to the printed circuit board 76.

Upon the components of the apparatus or module 10 shown in FIG. 8 and described above being assembled together, the housing members 71 and 72 are suitably secured together as described above.

The electrical interconnections of the telephone terminals, telephone subscriber terminals, terminal contacts, and the telephone circuits or MTU's are illustrated diagrammatically in FIG. 10. It will be understood that in FIG. 10 the pairs of telephone terminals 61 and 62 and 64 and 65 shown in FIG. 7 are represented by a single telephone terminal for convenience of presentation. As noted above, the telephone circuits or MTU's 41 and 42 are suitably mounted to the printed circuit board 76 in the manner known to the art. It will be assumed, FIG. 10, that the apparatus or module 10 has been mounted to the connector block 12 as described in detail above and as indicated diagrammatically by the downwardly extending dashed lines running from the terminal contacts 44 and 45 and 51 and 52 to the telephone terminals 61 and 62 and 64 and 65 respectively. The telephone circuit or MTU 41 is connected to the tip and ring conductors R1 and T1 of the incoming telephone company line L1 by the terminal contacts 44 and 45 and by suitable conductive traces of the type known to the art and indicated by the lines 121 and 122 in FIG. 10. The pair of telephone subscriber terminals 32 is connected to the tip and ring conductors T3 and R3 of telephone subscriber line L3 and the telephone circuit or MTU 41 is connected to these tip and ring conductors by suitable conductive traces extending between the MTU 41 and the pair of telephone subscriber terminals 32 and indicated by lines 123 and 124. Telephone circuit 42 is connected to the tip and ring conductors T2 and R2 of the incoming telephone company line L2 by the terminal contacts 51 and 52 and by suitable conductive traces of the type known to the art and indicated by the lines 126 and 127 in FIG. 10. The pair of telephone subscriber terminals 34 is connected to the tip and ring conductors T4 and R4 of the incoming telephone subscriber line L4 and the telephone circuit or MTU 42 is connected to the tip and ring conductors T4 and R4 by suitable conductive traces of the type known in the art running between the MTU 42 and the pair of telephone subscriber terminals 34 which conductive traces are indicated by the lines 126 and 127. It will be understood that the telephone circuits or MTU's 41 and 42 also are connected to earth ground by being connected to the spring clip ground terminal 78 by suitable conductive traces provided on the printed circuit board 76 and extending between the MTU's 41 and 42 and the ground clip 78 as indicated by the lines 128, 129 and 130. Upon the ground clip 78 being clipped to the ground bar 96 shown in FIG. 1, the telephone circuits or MTU's 41 and 42 are connected to earth ground.

It will be further understood that the apparatus or module 10 of the present invention, FIG. 10, permits direct testing of the incoming telephone company lines L1 and L2 while the apparatus or module 10 of the present invention remains mounted to the connector block 12. This is accomplished by pairs of test contacts or pads 133 and 134 being mounted to the housing and connected directly to the terminal contacts 44 and 45 and 51 and 52 by suitable conductive traces provided on the printed circuit board 76 and indicated by lines 136 and 137 and 138 and 139 which run from the pairs of test contacts 133 and 134 and are connected to the pairs of terminal contacts 44 and 45 and 51 and 52 which are in turn connected to the pairs of telephone terminals 61 and 62 and 64 and 65.

Referring now to FIGS. 11-17, there is shown another embodiment of apparatus and module of the present invention indicated by general numerical designation 110. A plurality of the apparatus and modules 110 are shown mounted to the connector block 12 in FIG. 11, and it will be understood, except for the differences described in detail below, the apparatus and module 110 are mounted to the connector block 12 in the same manner as apparatus or module 10 and performs substantially the same functions in substantially the same way as the apparatus and module 10 described above. The apparatus 110 includes the ground bar 96 as shown in FIG. 1 which is mounted to the fanning strip 100 of the connector block 12 in the same manner as described with regard to FIG. 1 and performs the same function as described above.

It will be generally understood, and referring particularly to FIGS. 12 and 15, that the apparatus and module 110 includes a base portion indicated by general numerical designation 112 and a pair of plug-in modules 114 and 116. The base portion 112 includes a transverse portion 118 and a pair of integrally formed, opposed and spaced apart trapezoidal portions 120 and 122 extending outwardly from the transverse portion 118. The trapezoidal portions 120 and 22 include a pair of upper flat angular surfaces 123 and 124, FIG. 2, disposed at the obtuse angle A1 with respect to the plug-in 5 modules 114 and 116 upon the modules being plugged into the base portion as shown in FIG. 12; the angle A1 is approximately 110°. Pairs of telephone subscriber terminals 132 and 134 are mounted respectively to the trapezoidal portions 120 and 122 and include portions which extend externally of the trapezoidal portions upwardly and angularly through the angular surfaces 123 and 124. Such mounting disposes the telephone subscriber terminals 132 and 134 at an acute angle A2 with respect to the plug-in modules 114 and 116 upon the module being mounted to the base portion 112 which angular disposition facilitates connection of the subscriber terminals to the telephone subscriber lines; the angle A2 is approximately 20°.

The plug-in modules 114 and 116 each house a telephone circuit of the type noted above and in the preferred embodiment each plug-in module houses a maintenance terminating unit or MTU for performing the same functions as the telephone circuits or MTU's 41 and 42 as shown particularly in FIGS. 4 and 10 and described in detail above. The plug-in modules 114 and 116 are each provided with five downwardly extending pins indicated generally by the numbers 136 and 138 in FIG. 15. The pins 136 and 138 plug into pluralities of electrically conductive mating receptacles shown in FIG. 15 and indicated by general numeric designations 140 and 141. It will be generally understood that two pins of each plurality of pins 136 and 138 are for being connected ultimately to the tip and ring conductors of a pair of incoming telephone company lines such as the lines L1 and L2 shown in FIG. 10, and that two pins of the plurality of pins 136 and 138 are for being connected ultimately to the tip and ring conductors of a pair of telephone subscriber lines such as the telephone subscriber lines L3 and L4 shown in FIG. 10. The remaining pin of each plurality of pins 136 and 138 is for being connected ultimately to the ground bar 96 shown in FIG. 11 and thereby to earth ground.

Representative plug-in module 114 is illustrated in FIG. 16 and includes a housing 144 in which is mounted a printed circuit board 146. A telephone circuit or MTU 148 is embodied as an integrated circuit (ASIC) and is suitably mounted to the printed circuit board 146 in the manner known to the art. It will be noted that the plurality of pins 136 is also mounted to the printed circuit board 146, and it will be understood that such pins are connected to the maintenance terminating unit or MTU 148 by suitable conductive traces (not shown) provided on the printed circuit board 146. It will be understood that the tolerances between the interior of the housing 144 and the exterior of the printed circuit board are such that the printed circuit board 146 is press fitted into the housing 144; alternatively the printed circuit board may be retained in the housing by a suitable potting compound.

Figure 17:
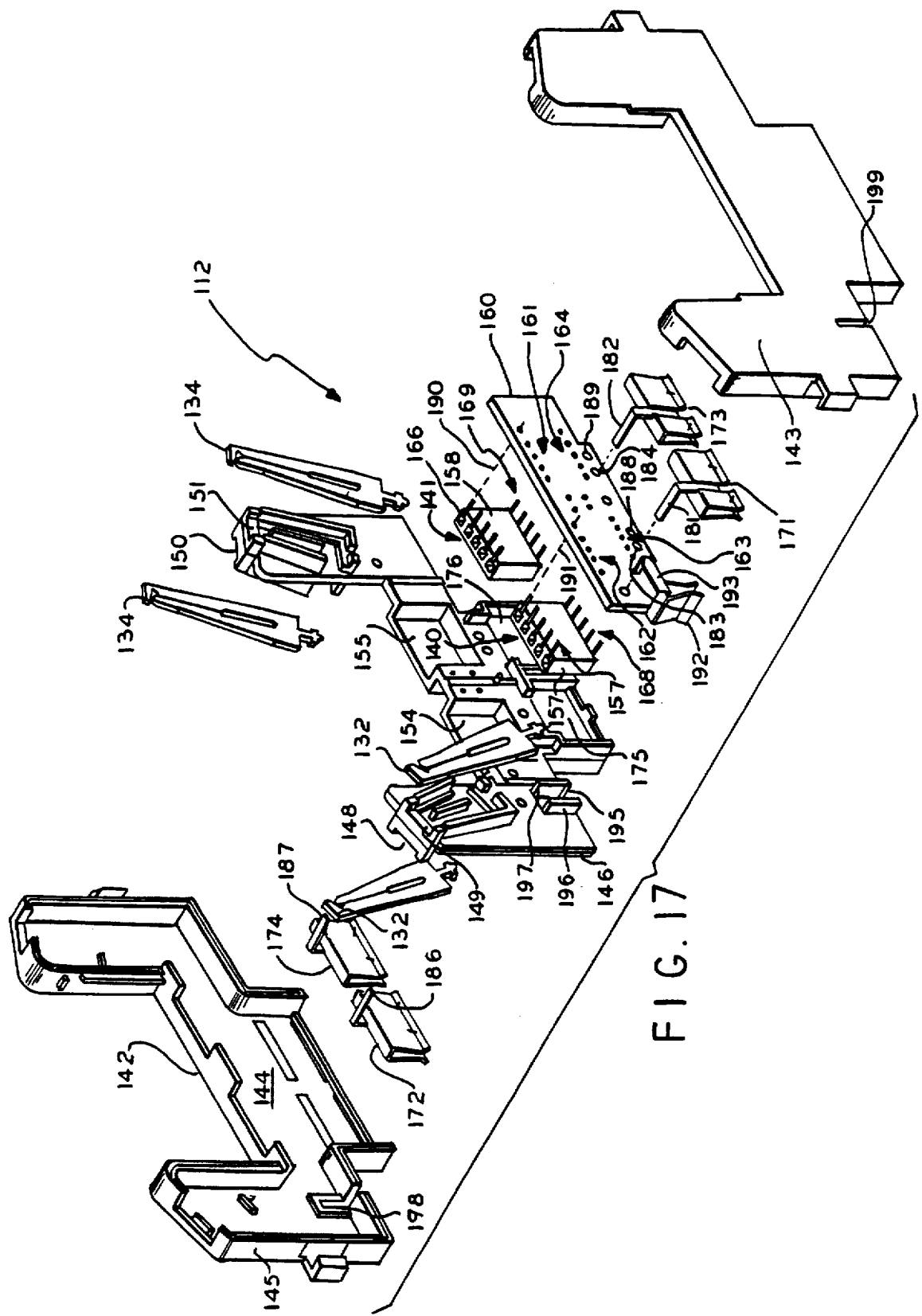
FIG. 17 is an exploded view showing the detailed structure of alternate apparatus and module of the present invention.

The detailed structure of the base portion 112 is shown in FIG. 17. The base portion 112 includes a pair of opposed housing members 142 and 143. Representative housing member 142 includes a base 144 surrounded by an outwardly extending wall 145 which provides a compartment and which compartment, in cooperation with the compartment (not shown) provided by the housing member 143, provides an overall compartment for receiving the other components of the base portion 112 shown in FIG. 17. Upon the other components, described below, being assembled and received within the compartment provided cooperatively by the housing members 142 and 143, the housing members are suitably secured together such as by ultrasonic welding. The base portion 112 includes a support or mounting member 146 which provides four slots 148 through 151 for respectively receiving and mounting the pairs of telephone subscriber terminals 132 and 134 in the same manner that the representative telephone subscriber terminal 34 a is mounted in the slot 86 shown in FIG. 9 and described in detail above. The support or mounting member 146 provides a pair of recesses 154 and 155 for respectively receiving the connector blocks 157 and 158 which blocks are of the type known to the art and which are provided with the pluralities of plug-in receptacles 140 and 141 shown in FIG. 15. A printed circuit board 160 is provided with pluralities of conductive apertures 161 . . . 164 for receiving and electrically interconnecting with pluralities of outwardly extending connectors 166 . . . 169 provided on the connector blocks 157 and 158. Pairs of spring clip terminal contacts 171 and 172 and 173 and 174 are provided for clip-on engagement with pairs of telephone terminals such as terminals 61 and 62 and 64 and 65 shown in FIG. 10 and perform the same functions as the pairs of terminal contacts 44 and 45 and 51 and 52 shown in FIG. 10 and described above. The support member 146 provides pairs of recesses or compartments 175 and 176 for respectively receiving the terminal contacts 171 and 173, and it will be understood that on the opposite side of the support member 146 another pair of compartments is provided for receiving the terminal contacts 172 and 174. The terminal contacts 171 and 173 include outwardly extending electrical contacts 181 and 182 for being received within electrically conductive holes or apertures 183 and 184 formed in the printed circuit board 160. Similarly, the terminal contacts 172 and 174 are provided with outwardly extending electrical contacts 186 and 187 for being received within the electrically conductive holes or apertures 188 and 189 formed in the printed circuit board 160. The outwardly extending connectors 166 ... 169 provided on the connector blocks 157 and 158 are received within electrically conductive holes or apertures formed in the printed circuit board 160 as indicated by the dashed lines 190 and 191 in FIG. 17. It will be further understood that the pairs of subscriber terminals 132 and 134 also are connected to the printed circuit board 160 by suitable conductors not shown but in the manner known to the art. A spring ground clip 192 is included and is provided with a contact 193 for being received in an electrically conductive opening formed in the printed circuit board 160. The spring clip ground contact 192 is received within and press fitted into a slot 195 and is wedgedly received between opposed and spaced apart members 196 and 197 defining the slot 195. The housing members 142 and 143 are provided respectively with inwardly extending slots 198 and 199 for receiving the ground bar 96 (FIG. 11) upon the apparatus or module 110 being mounted onto the connector block 12 (FIG. 11) whereupon the spring clip ground contact 192 mechanically and electrically engages the ground bar 96. Accordingly, it will be understood that the printed circuit board 160 is provided with suitable conductive traces (not shown) for connecting the spring clip terminal contacts 171 and 172 to two of the receptacles of the plurality of receptacles 140, for connecting the pair of telephone subscriber terminals 132 to two of the receptacles of the plurality of receptacles 140, for connecting the ground clip 192 to one of the receptacles in each of the plurality of receptacles 140 and 141, for connecting the spring clip terminal contacts 173 and 174 to two of the receptacles of the plurality of receptacles 141 and for connecting the pair of telephone subscriber terminals 134 to two of the receptacles of the plurality of receptacles 141. Thus, upon the apparatus or module 110 of the present invention being mounted on the connector block 12, FIG. 11, and upon the pins 136 and 138 (FIG. 15) of the plug-in modules 114 and 116 being plugged closed into the pluralities of mating receptacles 140 and 141, electrical connections will be made to the telephone circuits or MTU's mounted in the plug-in modules the same as is indicated diagrammatically in FIG. 10 for the MTU's 41 and 42 and described in detail above and the MTU's mounted in the plug-in modules 114 and 116 will function the same as the MTU's 41 and 42 shown in FIG. 10 and described above.

A test plug-in module 200 is shown in FIG. 18 which may be used to replace either of the plug-in modules 114 or 116 shown in FIGS. 12 and 15. It will be understood that test plug-in module 200 is substantially the same as the plug-in modules 114 and 116 and includes a plurality of outwardly extending pins 206 for being received in either of the pluralities of receptacles 140 or 141 shown in FIG. 15. A pair of test contacts 202 is provided, and these contacts, it will be understood, are connected directly to the two pins of the plurality of pins 206 which are connected ultimately to the tip and ring conductors of an incoming telephone company line such as either line L1 or L2 shown in FIG. 10. Test contacts 202 permit direct testing of the incoming telephone company line to which the plug-in test module 200 is connected while the apparatus or module 110 remains mounted to the connector block 12 in FIG. 11.

Figure 19:
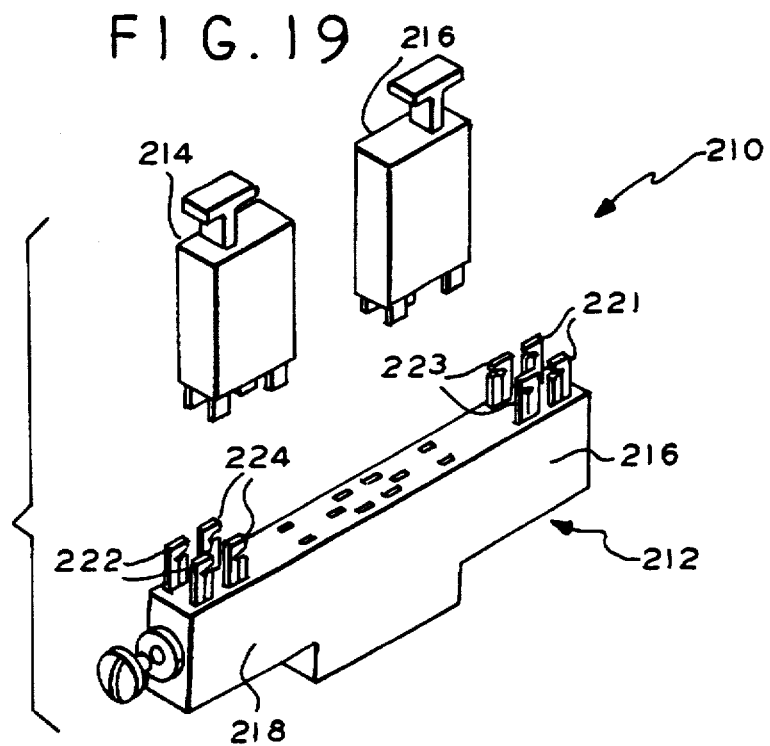
FIG. 19 is an exploded view of a further alternate embodiment of apparatus and module of the present invention.

Referring now to FIG. 19, a further alternate apparatus or module of the present invention is shown and indicated by general numerical designation 210. In particular, apparatus or module 210 is an alternative to the apparatus or module 110 described above and shown in FIGS. 11–17. It will be generally understood that the module 210 includes a pair of plug-in modules 214 and 216 which are substantially the same as the plug-in modules 114 and 116 described above and a base portion indicated by general numerical designation 212. Base portion 212 includes opposed end portions 216 and 218 and pairs of telephone subscriber terminals 221 and 222 extending upwardly through the respective end portions 216 and 218 and substantially perpendicular thereto. It will be understood that the base portion 212 is otherwise the same as and functions the same as the base portion 112 of the apparatus or module 110 described above, and that the base portion 212 is mounted to a connector block, such as connector block 12 shown in FIG. 11, in the same way that base portion 112 of module 110 is mounted to the connector block 12. The base portion 212 differs from the base portion 112 in that the base portion 212 is provided with pairs of upwardly extending test contacts 223 and 224 which are connected directly to the terminal contacts (not shown) which are the same as the terminal contacts 44 and 45 and 51 and 52 shown in FIG. 10. These test contacts permit the incoming telephone lines to be tested directly while the apparatus or module 210 remains mounted to the connector block 12 (FIG. 11).

It will be understood that while the above-described apparatus and modules of the present invention were described as being for connecting two incoming telephone company lines to two telephone subscriber lines, each half of each module may be used to connect one incoming telephone company line to one telephone subscriber line and this is contemplated by the present invention.

It will be understood by those skilled in the art that many variations and modifications may be made in the present invention without departing from the spirit and the scope thereof.

What is claimed is:

1. Apparatus for interconnecting at least one incoming telephone company line to at least one telephone subscriber line and for providing a response to signals carried by the incoming telephone company line, the apparatus for being mounted on a connector block including at least a first pair of telephone terminals to which the incoming telephone company line is connected, comprising:

at least one telephone circuit responsive to signals carried by the one incoming telephone company line;

housing means, said telephone circuit mounted in said housing means;

at least one pair of terminal contacts mounted to said housing means and connected to said telephone circuit and for mechanically and electrically engaging the first pair of telephone terminals to mount said housing means to the connector block and to connect said telephone circuit to the incoming telephone company line; and at least one pair of telephone subscriber terminals mounted to said housing means and connected to said telephone circuit, at least portions of said pair of telephone subscriber terminals extending externally of said housing means for connection to the telephone subscriber line.

2. The apparatus according to claim 1 wherein said apparatus further comprises first ground connecting means for being mounted to said connector block and for being connected to earth ground and second ground connecting means mounted to said housing means and connected to said telephone circuit and for being connected to said first ground connecting means to connect said telephone circuit to earth ground.

3. The apparatus according to claim 2 wherein the apparatus further includes at least one pair of test contacts mounted to said housing and connected to said pair of terminal contacts for direct connection to the incoming telephone company line through said pair of telephone terminals.

4. The apparatus according to claim 3 wherein said apparatus further includes a printed circuit board mounted in said housing, wherein said telephone circuit is embodied as an integrated circuit mounted on said printed circuit board, and wherein said pair of terminal contacts and said pair of telephone subscriber terminals are connected to said telephone circuit by conductive traces provided on said printed circuit board.

5. The apparatus according to claim 4 wherein said second ground connecting means comprises a spring contact mounted to said printed circuit board and connected to said telephone circuit by a conductive trace provided on said printed circuit board.

6. The apparatus according to claim 1 wherein said pair of telephone subscriber terminals are disposed at an angle with respect to said housing means to facilitate connection to the telephone subscriber line.

7. The apparatus according to claim 1 wherein said apparatus is also for connecting a second incoming telephone company line to a second telephone subscriber line and for providing a response to signals carried by the second incoming telephone company line, and wherein the connector block includes at least a second pair of telephone terminals to which the second incoming telephone line is connected, wherein the apparatus further comprises:

a second telephone circuit responsive to signals carried by the second incoming telephone company line and mounted in said housing means;

a second pair of terminal contacts mounted to said housing means and connected to said second telephone circuit and for mechanically and electrically engaging the second pair of telephone terminals to further mount said housing means to the connector block and to electrically connect the second telephone circuit to said second pair of telephone terminals;

a second pair of telephone subscriber terminals mounted to said housing means and connected to said second telephone circuit, at least portions of said second pair of telephone subscriber terminals extending externally of said housing means for connection to the second telephone subscriber line; and third ground connecting means connected to said second telephone circuit and for being connected to said first ground connecting means to connect said second telephone circuit to earth ground.

8. The apparatus according to claim 7 wherein said pairs of telephone subscriber terminals are disposed at an angle with respect to said housing means to facilitate connection to the telephone subscriber lines.

9. The apparatus according to claim 8 wherein said housing means includes a central generally rectangular portion and a pair of opposed generally trapezoidal side portions extending laterally outwardly from said central portion, said central portion including a pair of opposed parallel flat side surfaces and said trapezoidal portions including a pair of flat angular surfaces inclined upwardly towards and intersecting said side surfaces of said central portion at an obtuse angle.

10. The apparatus according to claim 9 wherein said pairs of telephone subscriber terminals are mounted respectively in said trapezoidal portions and wherein said portions of said pairs of telephone subscriber terminals extending externally of said housing extend externally through said flat angular surfaces.

11. The apparatus according to claim 7 wherein said apparatus further includes a printed circuit board mounted in said housing means, wherein said telephone circuits are embodied as integrated circuits mounted on said printed circuit board, wherein said pairs of terminal contacts and said pairs of telephone subscriber terminals are connected respectively to said telephone circuits by conductive traces provided on said printed circuit board.

12. The apparatus according to claim 11 wherein said apparatus further includes first and second pairs of test contacts mounted to said housing means and connected respectively to said first and second pairs of terminal contacts for direct connection respectively to the incoming telephone company lines through said first and second pairs of telephone terminals.

13. The apparatus according to claim 12 wherein said first and second pairs of test contacts are connected respectively to said first and second pairs of terminal contacts by conductive traces provided on said printed circuit board.

14. The apparatus according to claim 7 wherein the incoming telephone company lines emanate from a telephone central office and wherein telephone subscriber equipment is connected to said telephone subscriber lines and wherein said apparatus is inserted between the telephone central office and the telephone subscriber equipment, and wherein said telephone circuits are circuits for determining whether a fault is located on the telephone central office side or on the telephone subscriber equipment side of said apparatus.

15. The apparatus according to claim 7 wherein said telephone circuits are RFI circuits.

16. The apparatus according to claim 7 wherein said telephone circuits are attenuator circuits.

17. The apparatus according to claim 7 wherein said telephone circuits are half ringers.

18. Apparatus for interconnecting first and second incoming telephone company lines respectively to first and second telephone subscriber lines and for providing responses to signals carried by the first and second incoming telephone company lines, said apparatus for being mounted on a connector block including at least first and second pairs of telephone terminals to which said first and second incoming telephone company lines are connected respectively, comprising:

first and second telephone circuits responsive, respectively, to signals carried by the first and second incoming telephone company lines;

housing means, said first and second telephone circuits mounted in said housing means;

first and second pairs of terminal contacts mounted to said housing means and connected respectively to said first and second telephone circuits and for respectively mechanically and electrically engaging said first and second pairs of telephone terminals to mount said housing means to said connector block and to respectively connect said first and second telephone circuits to the first and second incoming telephone company lines; and first and second pairs of telephone subscriber terminals mounted to said housing means and connected respectively to said first and second telephone circuits and including at least portions which extend externally of said housing means for connection respectively to the first and second telephone subscriber lines.

19. The apparatus according to claim 18 wherein said apparatus further comprises first ground connecting means for being mounted to said connector block and for being connected to earth ground and second ground connecting means mounted to said housing means and connected to said first and second telephone circuits and for being connected to said first ground connecting means to connect said first and second telephone circuits to earth ground.

20. The apparatus according to claim 18 wherein said first and second pairs of telephone subscriber terminals are disposed at an angle with respect to said housing means to facilitate connection to the first and second telephone subscriber lines.

21. The apparatus according to claim 20 wherein said housing means includes a central rectangular portion and a pair of opposed trapezoidal side portions extending laterally outwardly from said central portion and wherein said first and second pairs of telephone subscriber terminals are mounted respectively in said first and second trapezoidal portions.

22. The apparatus according to claim 21 wherein said central rectangular portion includes a pair of opposed flat parallel side surfaces and wherein said trapezoidal portions include a pair of upper flat angular surfaces inclined upwardly towards and intersecting said parallel side surfaces at an obtuse angle, and wherein said external portions of said first and second pairs of telephone subscriber terminals extend respectively externally outwardly of said housing means through said flat angular surfaces.

23. The apparatus according to claim 18 wherein said housing means comprises a base portion and a pair of plug-in modules which plug into said base portion.

24. The apparatus according to claim 23 wherein said base portion includes a transverse portion and a pair of integrally formed opposed and spaced apart trapezoidal portions extending outwardly from said transverse portion, said trapezoidal portions including a pair of upper flat angular surfaces disposed at an obtuse angle with respect to said plug-in modules upon said modules being plugged into said base portion, wherein said externally extending portions of said first and second pairs of telephone subscriber terminals extend outwardly through said flat angular surfaces.

25. The apparatus according to claim 23 wherein said base portion includes a transverse portion having opposed end portions and wherein said externally extending portions of said first and second pairs of telephone subscriber terminals extend upwardly through said end portions substantially perpendicular to said transverse base member.

26. The apparatus according to claim 23 wherein said first and second telephone circuits are mounted respectively in said pair of plug-in modules.

27. The apparatus according to claim 18 wherein said apparatus further includes a printed circuit board mounted in said housing means, wherein said telephone circuits are embodied as integrated circuits mounted on said printed circuit board, wherein said pairs of terminal contacts and said pairs of telephone subscriber terminals are connected respectively to said telephone circuits by conductive traces provided on said printed circuit board.

28. The apparatus according to claim 27 wherein said apparatus further includes first and second pairs of test contacts mounted to said housing means and connected respectively to said first and second pairs of terminal contacts for direct connection respectively to the first and second incoming telephone company lines through said first and second telephone terminals.

29. The apparatus according to claim 28 wherein said first and second pairs of test contacts are connected respectively to said first and second pairs of telephone terminals by conductive traces provided on said printed circuit board.

30. The apparatus according to claim 18 wherein the incoming telephone company line emanates from a telephone central office and wherein telephone subscriber equipment is connected to said telephone subscriber line and wherein said apparatus is inserted between the telephone central office and the telephone subscriber equipment, and wherein said telephone circuit is a circuit for determining whether a fault is located on the telephone central office side or on the telephone subscriber equipment side of said apparatus.

31. The apparatus according to claim 18 wherein said telephone circuits are RFI circuits.

32. The apparatus according to claim 18 wherein said telephone circuits are attenuator circuits.

33. The apparatus according to claim 18 wherein said telephone circuits are half ringers.

* * * * *